United States Patent

Nakagawa et al.

[11] Patent Number: 5,409,731
[45] Date of Patent: Apr. 25, 1995

[54] METHOD FOR IMPARTING A HYDROPHILIC NATURE TO A CONTACT LENS

[75] Inventors: Akira Nakagawa, Nagoya; Teruyo Komura, Naruto, both of Japan

[73] Assignee: Tomei Sangyo Kabushiki Kaisha, Nagoya, Japan

[21] Appl. No.: 957,779

[22] Filed: Oct. 8, 1992

[51] Int. Cl.⁶ .............................................. B05D 5/06
[52] U.S. Cl. ................................. 427/2.12; 427/164; 427/338; 427/340; 427/343.5
[58] Field of Search ................ 427/164, 2, 337, 338, 427/340, 393.5, 2.12, 2.24

[56] References Cited

U.S. PATENT DOCUMENTS

| | | | |
|---|---|---|---|
| 4,168,112 | 9/1979 | Ellis et al. | 427/164 |
| 4,565,740 | 1/1986 | Gölander et al. | 428/409 |
| 4,801,475 | 1/1989 | Halpern et al. | 427/338 |
| 4,876,126 | 10/1989 | Takemura et al. | 427/2 |
| 4,897,433 | 1/1990 | Sugo et al. | 427/2 |
| 5,023,114 | 6/1991 | Halpern et al. | 427/2 |
| 5,049,403 | 9/1991 | Larm | 427/2.24 |
| 5,080,924 | 1/1992 | Kamel et al. | 427/2 |
| 5,128,170 | 7/1992 | Matsuda et al. | 427/2.24 |
| 5,148,311 | 9/1992 | Beavers et al. | 427/164 |
| 5,217,492 | 6/1993 | Guire et al. | 427/2 |

*Primary Examiner*—Janyce Bell
*Attorney, Agent, or Firm*—Oblon, Spivak, McClelland, Maier & Neustadt

[57] ABSTRACT

A method for imparting a hydrophilic nature to a contact lens, which comprises dipping a contact lens in a solution containing a water-soluble amino group-containing polymer in an amount effective to impart a hydrophilic nature to the contact lens and a crosslinking agent in an amount effective to crosslink the amino group-containing polymer, and forming a hydrophilic layer of the amino group-containing polymer crosslinked on the surface of the contact lens.

20 Claims, No Drawings

METHOD FOR IMPARTING A HYDROPHILIC NATURE TO A CONTACT LENS

BACKGROUND OF THE INVENTION

1. Field of the Invention

The present invention relates to a method for treating a contact lens to impart a hydrophilic nature thereto. More particularly, it relates to a method for treating the surface of a contact lens having a strong hydrophobic nature, such as a hard contact lens or a water-nonabsorptive soft contact lens to impart a hydrophilic nature thereto advantageously.

2. Discussion of Background

Contact lenses which are-practically used at present, may be classified generally into those made of water-absorptive material and those made of water-nonabsorptive material. As water-absorptive contact lenses, those made essentially of a polyhydroxy methacrylate or polyvinyl pyrrolidone may be mentioned. As water-nonabsorptive contact lenses, those made essentially of polymethyl methacrylate or silicone rubber, or those made of a copolymer of a polysiloxanyl methacrylate with methyl methacrylate or the like, having oxygen permeability, may be mentioned. Water-absorptive contact lenses have a merit that they give a comfortable feeling to the wearers, but they have a demerit that they are likely to be contaminated with bacteria, and even when the cornea is damaged, irritation is little, whereby there is a danger of leading to a serious disease without notice. On the other hand, water-nonabsorptive contact lenses are relatively free from contamination with bacteria, but their surface has water repellency. Among them, contact lenses having high oxygen permeability have a particularly strong hydrophobic nature.

On the other hand, vital tissue-compatible contact lenses made of a vital component such as collagen, have been proposed. Collagen is a fibrous protein constituting from about 20 to about 30% of the total protein of the whole body of a vertebrate and serves mainly as support tissues and cell skeletons. Such collagen has very weak antigenicity and is composed of hydrophilic amino acids, and it is provided with suitable conditions as a lens material, such as transparency. However, when it is to be molded into lenses, it has problems with respect to the physical strength, susceptivity to contamination with bacteria and difficulty in processing.

On the other hand, various proposals have been made for a method of imparting a hydrophilic nature by modifying the surface of the above-mentioned water-nonabsorptive contact lens having a strong hydrophobic nature. A contact lens poor in the hydrophilic nature of the surface or poor in the wettability with tear, is likely to have a problem in the vision-correction when it is put on the eye, and the movement of the lens on the cornea is poor, thus leading to a problem in fitting or a problem of giving an uncomfortable feeling to the wearer. Further, when such a contact lens is put on the eye, a lipid from sticky secretion collecting in the eye tends to adhere and form a stain on the lens surface, thus leading to fogging of the lens and impairment of the visibility.

As a method to impart a hydrophilic nature to the surface of such a water-nonabsorptive contact lens having a strong hydrophobic nature, it is conceivable to employ a plasma treatment method or a chemical treatment method using an acid or an alkali. However, such a method has a problem in the durability of the hydrophilic nature, and if the treatment to impart hydrophilicity is to be applied again, the corresponding work and an extensive apparatus will be required.

Further, Japanese Unexamined Patent Publication No. 271410/1988 proposes a method for imparting a hydrophilic nature to a contact lens, which comprises contacting a contact lens to a solution containing a hydrophilic monomer and a photosensitizer selected from the group consisting of aromatic ketones and quinones, followed by irradiation with ultraviolet rays. However, this method has a problem that the hydrophilic monomer and ultraviolet rays are not safe to a vital body, and the contact lens itself is likely to undergo a deterioration such as coloring or deformation by ultraviolet rays.

Further, U.S. Pat. No. 4,801,475 proposes a method for imparting a hydrophilic nature, which comprises coating an aqueous mucopolysaccharide solution on a plastic such as a contact lens, dehydrating it with a solvent missible with water, and then crosslinking and fixing it with a polyisocyanate, followed by drying. However, such a method is not only cumbersome but also has a problem that it is rather difficult to uniformly coat the mucopolysaccharide on a contact lens, and the solvent used for dehydration tends to give an adverse effect to the lens standards.

Whereas, as a method for conducting the treatment for hydrophilicity relatively simply, a method for conducting the surface modification of a contact lens has been proposed which comprises dipping a contact lens in a solution containing a hydrophilic polymer to deposit the polymer on the surface of the contact lens.

As such a solution containing a hydrophilic polymer, for example, Japanese Examined Patent Publication No. 37910/1973 discloses a solution for contact lenses, which contains a water-soluble polymer such as polyvinyl alcohol, hydroxyethyl cellulose or polyvinyl pyrrolidone. However, such a treating solution has a drawback that the adsorptive force of the polymer to the contact lens surface is weak, and there is no adequate effect to a material having a strong hydrophobic nature, such as a material of a water-nonabsorptive contact lens containing a substantial amount of a silicon component or a fluorine component.

Further, Japanese Unexamined Patent Publication No. 246718/1988 discloses a lens-treatment solution for treating the surface of a contact lens, which comprises a polymer material having an ionic charge. With such a solution, however, it is required that the charge density of the contact lens has a certain level, and accordingly, it is necessary to conduct a treatment to increase the charge density of the contact lens surface prior to the treatment to impart the hydrophilic nature. Thus, the process tends to be cumbersome. Besides, even when a contact lens is treated with-such a solution of a polymer having ionic groups, the durability is very poor, and there has been a drawback that the water wettability tends to be poor when the contact lens treated with such a solution is touched by a finger for application or when blinking only a few times after such a lens was put on the eye.

Further, U.S. Pat. No. 4,786,436 proposes a hydrophilic solution for a contact lens utilizing the hydrophilic nature of collagen and the characteristic of the compatibility of collagen with a vital body, and Japanese Unexamined Patent Publication No. 50014/1989 proposes a solution for a contact lens, which contains a cationic polymer such as a cationic derivative of polysaccharide, such as Chitosan. It is possible to impart a hydrophilic nature to a hydrophobic contact lens surface by dipping the contact lenses to such solutions. However, in each case, there has been a drawback that the durability of the hydrophilic state is very poor, and the water wettability tends to be poor when the contact lens treated with such a solution is touched with a finger for application or when blinking only a few times after it was put on the eye.

SUMMARY OF THE INVENTION

Under these circumstances, it is an object of the present invention to provide a method for imparting a hydrophilic nature to the surface of a contact lens so that a stain e.g. a lipid against the contact lens can be suppressed or reduced and such a contact lens can be put on the eye comfortably for a long period of time, whereby the treatment can be conducted safely and simply and yet the durability of the hydrophilic state after the treatment is excellent.

To accomplish such an object, the present invention provides a method for imparting a hydrophilic nature to a contact lens, which comprises dipping a contact lens in a solution containing a water-soluble amino group-containing polymer in an amount effective to impart a hydrophilic nature to the contact lens and a crosslinking agent in an amount effective to crosslink the amino group-containing polymer, and forming a hydrophilic layer of the amino group-containing polymer crosslinked on the surface of the contact lens.

Further, the present invention provides a method for imparting a hydrophilic nature to a contact lens, which comprises contacting a contact lens to a solution containing a water-soluble amino group-containing polymer in an amount effective impart to a hydrophilic nature to the contact lens, to have the amino group-containing polymer adsorbed on the surface of the contact lens, and then contacting the contact lens to a solution containing a crosslinking agent in an amount effective to crosslink such an amino group-containing polymer, to crosslink the amino group-containing polymer on the surface of the contact lens and thereby to impart a hydrophilic nature to the contact lens.

DETAILED DESCRIPTION OF THE PREFERRED EMBODIMENTS

The water-soluble amino group-containing polymer to be used in the present invention, is highly hydrophilic, readily adsorbable on a contact lens and safe, and it may, for example, be a protein, a polysaccharide or a derivative thereof, or a hydrophilic synthetic polymer. Specifically, the protein may, for example, a spherical protein of e.g. albumin, globulin or casein, a fibrous protein of e.g. collagen, keratin or silk, or a derivative thereof. As such a derivative, a partial hydrolyzate having an average molecular weight of at least 400 or an acylated product, may, for example, be mentioned. The protein may be derived from an animal such as a human, a cow or a pig, or a plant such as soybean. Among them, a water-soluble collagen derivative is particularly preferred, since it has excellent transparency and high compatibility with a vital body and is highly adsorbable on a contact lens.

Specifically, the water-soluble collagen derivative useful in the present invention, may, for example, water-soluble collagen obtained by extracting insoluble collagen with an acid, atelocollagen obtained by hydrolyzing and removing telopeptide, gelatin, hydrolyzed collagen peptide, or chemically modified methylated collagen decomposition product.

Such water-soluble derivatives of collagen may be prepared by a conventional method from tissues of e.g. coria, bones, sinews or lenticular envelopes of mammals such as cows, pigs or humans. For example, atelocollagen is a protein having a molecular weight of about 100,000 which can be prepared by solubilizing insoluble collagen with pepsin, followed by separation and purification by means of an acidic solution or sodium chloride. Gelatin is a protein having a molecular weight of from 100,000 to 250,000 which can be prepared by pretreating insoluble collagen with acidic hot water or alkali, followed by extraction and purification with acidic hot water, as disclosed in the commentary of Pharmacopeia of Japan, 11th Edition. Hydrolyzed collagen is a peptide obtained by hydrolyzing atelocollagen or gelatin with a protease, and its molecular weight varies depending upon the conditions for the hydrolysis. However, the hydrolyzed collagen to be used in the present invention is the one having an average molecular weight of at least about 400. If the molecular weight of the water-soluble derivative of collagen is less than 400, the effect to impart a hydrophilic nature when it is contacted with a contact lens, tends to be small.

In the present invention, an amino group-containing derivative of a polysaccharide is also preferably used as the amino group-containing polymer. As such an amino group-containing derivative of a polysaccharide may be any polysaccharide so long as it is water-soluble and contains amino groups. Specifically, there may be mentioned a deacetylated product or a desulfonated product of an amino polysaccharide or a derivative obtained by chemically imparting amino groups thereto. More specifically, there may be mentioned an amino derivative of dextran, cellulose, pullulan, starch, gum arabic or sodium arginate, such as diethylamino ethyl dextran, or a derivative of an amino polysaccharide such as a deacetylated product of e.g. chitin, hyaluronic acid, chondroitin, chondroitin sulfate, kerato sulfate, tachlonic acid or colomic acid, or a desulfonated product of heparin. Among them, the deacetylated product of chitin is generally called chitosan and is readily available, and it is excellent in compatibility with a vital body and thus is suitable for use in the present invention. Its derivative such as carboxyl methyl chitosan, glycol chitosan, N,N-dimethylamino chitosan or N,N-diethylamino chitosan, may also be used.

The hydrophilic synthetic polymer may, for example, be a polymer of an amino acid such as lysine, arginine or glycine, or a copolymer of a hydrophilic monomer such as 2-hydroxymethacrylate or acrylamide with an amino group-containing monomer such as aminoethyl acrylate or aminopropyl acrylamide.

In the present invention, such amino group-containing polymers may be used alone or in combination as a mixture of two or more of them.

On the other hand, the crosslinking agent to be used in the present invention, may, for example, be a polyfunctional compound capable of crosslinking an amino group to an amino group, a transglutaminase, or a condensed reagent capable of crosslinking an amino group to a carboxyl group. In the present invention, any one of them may suitably be selected for use.

Specifically, the polyfunctional compound is a compound capable of reacting with at least two amino groups of an amino group-containing polymer at a temperature around room temperature, and it may, for example, be a dialdehyde, an isocyanate derivative, a bisdiazobenzidine, N,N'-polymethylenebisiodoacetamide, an N,N'-ethylenebismaleimide, a halogen acetyl derivative or a polyepoxy compound. More specifically, it may, for example, be glutaraldehyde, o-phthalaldehyde, hexamethylene diisocyanate, toluene diisocyanate, hexamethylene dithiocyanate, N,N'-bis(2-carboxyimidoethyl)tartaric acid imidodimethyl ester, n-(γ-maleimidobutyryloxy)succinimide, N,N'-(1,2-phenylene)bismaleimide, N,N'-(1,4-phenylene)bismaleimide, chlorotriazine, ethylene glycol diglycidyl ether, polyethylene glycol diglycidyl ether, glycerol polyglycidyl ether, sorbitol polyglycidyl ether or trimethylolpropane triglycidyl ether.

In the present invention, when the amino group-containing polymer contains carboxyl groups in addition to the amino groups, a condensed reagent capable of crosslinking such amino groups to the carboxyl groups, may be employed, which includes, for example, 1-ethyl-3-(3-dimethylaminopropyl)carbodiimide hydrochloride, 1-cyclohexyl-3-(2-morphoryl-4-ethyl)-carbodiimide.metho-p-toluene sulfonate and N-ethyl-5-phenylisoxalonium-3'-sulfonate.

Further, in the present invention, when a protein derivative such as a water-soluble collagen is used as the amino group-containing polymer, it is possible to crosslink it by means of a transglutaminase. The transglutaminase is an enzyme which catalyzes an acyl-transfer reaction between a γ-carboxyamide and a primary amine of the glutamin residue of a protein, and when an ε-amino group of the lysine residue in the protein acts as an acyl-receptor, a crosslinkage will be formed. This enzyme may be derived from various organs such as a liver, a lens and an epidermis of mammals, from microorganisms such as bacteria or actinomycetes, or from those prepared by gene manipulation. In the present invention, a transglutaminase from any origin may be employed.

Further, a buffering agent, a neutralizing agent for functional groups, a metal chelating agent, an anticeptic or a thickener may optionally be added to the solution containing the amino group-containing polymer or the crosslinking agent.

Such a buffering agent is used to maintain the solution used in the present invention at a prescribed pH level, and it may, for example, be an ophthalomologically acceptable buffering agent such as a phosphate buffer, a borate buffer, an organic acid type buffer, a carbonate buffer, an amino acid type buffer, a triethanolamine-hydrochloric acid buffer, a tris(hydroxymethyl)aminomethane-hydrochloric acid buffer or a veronal buffering solution. Especially, a buffering agent having amino groups, such as an amino acid type buffering solution or a tris(hydroxymethyl)aminomethane-hydrochloric acid buffer, is useful also as a neutralizing agent for functional groups, since it is reactive with functional groups of an excess crosslinking agent. The buffer solution to be used, is properly selected depending upon the desired pH level within a range of from pH 2 to pH 12. For example, when atelocollagen or gelatin is used as the amino group-containing polymer, the buffer solution within a range of pH 4 to pH 9 is selected for use, and when an acid-extracted collagen or chitosan is used, a buffer solution within a range of pH 2 to pH 6 is selected for use. The amount is usually selected so that its concentration is from about 0.01 to 0.05 mol/l.

The metal chelating agent is added to prevent precipitation to a contact lens of calcium in tear deposited on the contact lens taken out from the eye. Specifically, ethylenediaminetetracetic acid, nitrilotriacetic acid and their salts may, for example, be preferably employed. If the amount of such a chelating agent is too small, no adequate effects will be obtained, and if it is too much, no further effects will be obtained. Therefore, the amount is preferably adjusted so that it is contained in an amount of from about 0.001 to 0.1 mol/l.

The antiseptic is used to prevent the solution used in the present invention from being contaminated with bacteria. Specifically, it may, for example, be a quaternary ammonium salt type antiseptic such as benzalkonium chloride or chlorohexydine, an alcohol type antiseptic such as chlorobutanol, methyl parabene, a sorbic acid salt, and a methyl ester, ethyl ester or propyl ester of benzoic acid. It is incorporated usually in an amount within a range of from 0.001 to 1% (W/V).

Further, the thickener is incorporated to facilitate cleaning so that when the treatment to impart a hydrophilic nature to a contact lens is conducted by the method of the present invention, an excess solution deposited on the contact lens surface can readily be cleaned with fingers, etc. Specifically, it may, for example, be methyl cellulose, carboxymethyl cellulose, hydroxypropyl cellulose, gum arabic, chondroitin sodium sulfate, sodium arginate, a copolymer of isobutylene with maleic anhydride or polyvinyl alcohol. It is usually incorporated in an amount within a range of from 0.1 to 2% (W/V).

In the present invention, the amino group-containing polymer as described above, is adsorbed on the contact lens surface, and the amino group-containing polymer adsorbed on the contact lens surface is crosslinked by the prescribed crosslinking agent, to form a hydrophilic layer of the crosslinked amino group-containing polymer, whereby a hydrophilic nature is imparted to the contact lens. In the present invention, it is possible to employ a method (Method A) wherein the amino group-containing polymer and the crosslinking agent are mixed in one solution immediately prior to the treatment to impart a hydrophilic nature, and then the treatment is conducted, or a method (Method B) wherein a contact lens is firstly contacted with a solution containing the amino group-containing polymer to have the amino group-containing polymer adsorbed on the contact lens surface, and then the contact lens is contacted with a solution containing the crosslinking agent to crosslink the amino group-containing polymer on the contact lens surface to impart a hydrophilic nature to the contact lens. In such method A, the adsorption and the crosslinking reaction are conducted at once in the same container, whereby there is a merit that the treatment to impart a hydrophilic nature can be conducted very simply. In the method B, the solution containing the amino group-containing polymer may be used also as a preservative solution for contact lenses.

More specifically, in the method A, a solution containing the amino group-containing polymer and a solution containing the crosslinking agent are mixed first. There is no particular limitation as to the volume proportions for mixing. However, as the respective concentrations after mixing, the amino group-containing polymer is usually within a range of from about 0.0001 to 5% (W/V), preferably from about 0.1 to 2% (W/V), and the crosslinking agent is usually within a range of from about 0.001 to 1% (W/V), preferably from about 0.01 to 0.5 (W/V). There is no particular restriction as to the ratio of the concentrations of the two. If the concentrations of the two are less than the above ranges, the hydrophilic nature can not adequately be imparted. On the other hand, if the concentrations exceed the above ranges, the crosslinking agent is likely to react with the amino group-containing polymer in the solution, whereby the solution tends to be geled. The pH of the solution after mixing is usually within a range of from about 3 to 12.

After such mixing, a contact lens to be treated is immediately dipped in the solution to conduct the treatment to impart the hydrophilic nature. The treatment is conducted within a temperature of from about 5° to 40° C. for from about 5 minutes to 48 hours. Thus, when the contact lens is dipped in the solution, the amino group-containing polymer is adsorbed on the contact lens surface, then the amino group-containing polymer is crosslinked by the crosslinking agent, whereby a hydrophilic nature is imparted. Here, it is believed that although the crosslinking reaction proceeds immediately after the amino group-containing polymer and the crosslinking agent are mixed, the adsorption of the amino group-containing polymer on the contact lens is very quick as compared with the crosslinking reaction, whereby the hydrophilic nature can be satisfactorily imparted without any particular problem.

Finally, the contact lens treated for hydrophilicity, is cleaned to remove an excess solution deposited on the surface. The cleaning agent used for this purpose may be tap water, purified water, or a commercially available cleaning agent or preservative agent for contact lenses. The cleaning method may be rinsing with running water or rubbing with fingers. The hydrophilic nature of the contact lens will not be changed by such a method.

On the other hand, in the method B, firstly, a contact lens to be treated for hydrophilicity, is contacted with a solution containing the amino group-containing polymer. Here, the amino group-containing polymer is used in such an amount that when contacted with a contact lens, the amino group-containing polymer is adsorbed on the contact lens to provide good water wettability to the lens surface. Specifically, the amount is within a range of from about 0.0001 to 20% (W/V), preferably from 0.01 to 2% (W/V). If the amount of the amino group-containing polymer is less than about 0.001%, the effect to impart a hydrophilic nature when contacted with a contact lens, tends to be very small. On the other hand, if the amount is larger than about 20%, the effect to impart a hydrophilic nature will no longer substantially increase.

The pH of the solution containing the amino group-containing polymer is selected suitably within a wide range of from about pH 3 to pH 12 depending upon the nature of the polymer.

With respect to the conditions for contacting the contact lens with the solution containing the amino group-containing polymer, the treatment may be conducted at a temperature within a range of from 5° to 40° C. for at least about 5 seconds. As a specific method for contacting the contact lens with the solution containing the amino group-containing polymer, it is possible to employ a method wherein the contact lens is fixed by a holder and dipped in a container filled with the solution containing the amino group-containing polymer, or a method wherein a solution containing the amino group-containing polymer is dropped on the contact lens surface by e.g. a dropping pipette.

Then, an excess amino group-containing polymer deposited on the contact lens surface is washed off with an aqueous medium. Such an aqueous medium may not contain a substance which interferes with the adsorption of the amino group-containing polymer on the contact lens. Specifically, it may be water such as tap water or purified water, an aqueous sodium chloride solution or a preservative solution for contact lenses. Usually, such washing is conducted with tap water which can be used simply and in a large amount. Such an washing operation may be conducted either by immersing the contact lens treated for hydrophilicity, in a container filled with water for at least a few seconds, or by exposing the contact lens after the treatment, to running water to wash off an excess amino group-containing polymer. Thus, the amino group-containing polymer is adsorbed on the contact lens having a hydrophobic nature on its surface, and the water wettability of the contact lens will be excellent. However, in such a state, if a finger or a lens holder is touched on the lens surface, the amino group-containing polymer tends to be removed, whereby the water wettability of the lens surface tends to decrease.

Therefore, the adsorbed amino group-containing polymer is then crosslinked to form a coating film which will not be removed by a physical force such as washing with finger tips. For this purpose, a solution containing a crosslinking agent will be contacted to the contact lens treated as described above. This contacting is conducted at a temperature of from about 5° to 40° C. for from 5 minutes to 48 hours, preferably from 20 minutes to 18 hours. As the contacting method, it is possible to employ a method wherein the contact lens is held by e.g. a holder and immersed in a container filled with a solution containing the crosslinking agent, or a method wherein a solution containing the crosslinking agent is dropped on the contact lens surface by e.g. a dropping pipette.

The amount of the crosslinking agent is selected within a range of from about 0.001 to 5% (W/V), preferably from about 0.01 to 1% (W/V). If the amount is less than about 0.001%, the amino group-containing polymer will not sufficiently be crosslinked. On the other hand, if the amount exceeds about 5%, no further improvement will be obtained in the effect to impart a hydrophilic nature.

The pH of the solution containing the crosslinking agent may suitably be selected within a range of from about 3 to 12 depending upon the type of the crosslinking agent. For example, when glutaraldehyde is used as the crosslinking agent, the pH is usually within a range of from about 16 to 12, preferably from about 7 to 9, and when carbodiimide is used as the crosslinking agent, the pH is usually within a range of from about 3 to 7, preferably from about 4 to 6.

Finally, the contact lens treated for hydrophilicity is cleaned to remove an excess crosslinking agent deposited on the surface. The cleaning agent used for this purpose, may, for example, be tap water, purified water, or a commercially available cleaning agent or preservative solution for contact lenses. The cleaning method may be rinsing with running water or rubbing with finger tips. The hydrophilic nature of the contact lens will not be changed by such a method.

Further, in a case where it is likely that functional groups of the crosslinking agent still remain after such cleaning, the contact lens may be immersed in a solution containing amino groups, as the case requires. In such a case, a solution of e.g. an amino acid, tris(hydroxy)aminomethane or an amine, may be used as the solution containing amino groups. However, the contact lens may be immersed in a solvent containing the amino group-containing polymer used in the present invention.

As described in the foregoing, by employing the method for treating to impart a hydrophilic nature according to the present invention (method A or B), hydrophilicity strong against physical impacts such as cleaning with finger tips, can be obtained safely and in an extremely simple manner, and the contact lens having such hydrophilicity imparted can be worn comfortably without adhesion or fixing of a stain such as a lipid.

Now, the present invention will be described in further detail with reference to some Examples. However, it should be understood that the present invention is by no means restricted by such specific Examples.

EXAMPLE 1

A water-nonabsorptive contact lens made of a copolymer composed essentially of tris(trimethylsiloxy)silylpropyl methacrylate and 1,1,1,3,3,3-hexafluoro-2-propyl methacrylate, was prepared, and the contact angle of this lens was measured by a contact angle meter (Gonio meter type contact angle meter G-1 Model, manufactured by Elma Kogaku K.K.) in accordance with a sessile drop method and found to be 99.6°.

Then, this contact lens was dipped in 20 mM phosphate buffer (pH 7.0) containing 0.1% of gelatin (manufactured by Difco Laboratories) and 0.05% of glutaraldehyde, at room temperature for two hours. Then, it was washed with finger tips by means of a cleaning solution for contact lenses (O$_2$ Care, tradename, manufactured by Menicon Co., Ltd.) and thoroughly rinsed with tap water to complete the treatment for hydrophilicity. With respect to the contact lens thus treated for hydrophilicity, the contact angle was measured in the same manner as above and found to be 43.8°.

COMPARATIVE EXAMPLE 1

The same contact lens as used in Example 1 was dipped in 20 mM phosphate buffer (pH 7.0) containing 0.1% of gelatin, at room temperature for two hours. Then, it was cleaned by finger tips using the cleaning solution for contact lenses (O$_2$ Care, tradename, manufactured by Menicon Co., Ltd.) and thoroughly rinsed with tap water to complete the treatment for hydrophilicity. With respect to the lens thus obtained, the contact angle was measured in the same manner as above and found to be 93.8°.

From the results of Example 1 and Comparative Example 1, it is evident that according to the present invention, it is possible to obtain a high level of effect to impart a hydrophilic nature.

EXAMPLE 2

The operation was conducted in the same manner as in Example 1 using a water-nonabsorptive contact lens made of a copolymer of methyldi(trimethylsiloxy)silyl (propylglycerol)monomethacrylate with methyl methacrylate instead of the contact lens used in Example 1. As a result, the contact angle after the treatment for hydrophilicity was 52.0°, while the contact angle prior to the treatment for hydrophilicity was 101.6°.

EXAMPLE 3

The operation was conducted in the same manner as in Example 1 using 20 mM phosphate buffer (pH 6.5) containing 0.1% gelatin and 0.2% of 1-ethyl-(3-dimethylaminopropyl)carbodiimide hydrochloride, instead of the solution for hydrophilicity used in Example 1, whereby the contact angle after the hydrophilic treatment of the lens was 54.9°.

EXAMPLE 4

The operation was conducted in the same manner as in Example 1 using 20 mM phosphate buffer (pH 7.0) containing 1% of bovine serum albumin (manufactured by Wako Junyaku K.K.) and 0.1% of glutaraldehyde, instead of the solution for hydrophilicity used in Example 1, whereby the contact angle after the hydrophilic treatment of a lens was 61.8°.

EXAMPLE 5

The hydrophilic treatment was conducted in the same manner as in Example 1 using a dilute hydrochloric acid solution (pH 4.0) containing 0.1% of Chitosan (manufactured by Koyo Chemical K.K.) and 0.2% of 1-ethyl-(3-dimethylaminopropyl)carbodiimide hydrochloride, instead of the solution for hydrophilicity used in Example 1, and the contact lens was cleaned ten times by finger tips using a cleaning solution for contact lenses (O$_2$ Care, tradename, manufactured by Menicon Co., Ltd.) and thoroughly rinsed with tap water. Then, the contact angle was measured in the same manner as above and found to be 63.8°.

COMPARATIVE EXAMPLE 2

The hydrophilic treatment was conducted in the same manner as in Example 1 using a dilute hydrochloric acid solution (pH 4.0) containing 0.1% of Chitosan (manufactured by Koyo Chemical K.K.), instead of the solution for hydrophilicity used in Example 1, and the contact lens was rinsed ten times by finger tips using a cleaning solution for contact lenses (O$_2$ Care, tradename, manufactured by Menicon Co., Ltd.) and thoroughly rinsed with tap water. Then, the contact angle was measured in the same manner as above and found to be 102.2°.

From the results of Example 5 and Comparative Example 2, it is evident that the effect to impart a hydrophilic nature in the present invention is very high.

EXAMPLE 6

The operation was conducted in the same manner as in Example 1 using 20 mM tris(hydroxymethyl)aminomethane-hydrochloric acid buffer (pH 6.8) containing 0.1% of gelatin, 0.05% of glutaraldehyde, 0.02% of ethylendiamine tetraacetate trisodium salt, 0.15% of potassium sorbate and 0.2% of carboxymethyl cellulose (manufactured by Wako Junyaku K.K.), instead of the solution for hydrophilicity used in Example 1, whereby the contact angle of the lens after the hydrophilic treatment was 56.9°.

EXAMPLE 7

The same contact lens as used in Example 1 was dipped in 20 mM tris(hydroxymethyl)aminomethane-hydrochloric acid buffer (pH 6.8) containing 1% of gelatin, 0.02% of ethylendiamine tetraacetate trisodium salt, 0.15% of potassium sorbate and 0.2% of carboxymethyl cellulose, for 30 seconds. Then, this contact lens was gently rinsed with tap water and then immersed in a 50 mM sodium hydrogen carbonate (pH 8.0) containing 0.1% of glutaraldehyde. Then, this contact lens was cleaned by finger tips using a cleaning solution for contact lenses (O₂ Care, tradename, manufactured by Menicon Co., Ltd.) and thoroughly rinsed with tap water. Then, the contact angle was measured in the same manner as in Example 1 and found to be 55.1°.

EXAMPLE 8

The operation was conducted in the same manner as in Example 7 using 20 mM citrate buffer (pH 4.0) containing 0.11% of collagen (Collapur, tradename, manufactured by Ichimaru Falcos K.K.), whereby the contact angle of the lens after the hydrophilic treatment was 56.8°.

EXAMPLE 9

The hydrophilic treatment was conducted in the same manner as in Example 7 except that dipping treatment was conducted for 18 hours at room temperature using trimethylol propane triglycidyl ether (Epolyte 100 MF, tradename, manufactured by Kyoeisha Jyushi Kagaku Kogyo K.K.), instead of glutaraldehyde used in Example 7, whereby the contact angle of the lens after the hydrophilic treatment was 66.5°.

It is evident from the foregoing description that according to the present invention, a water-soluble amino group-containing polymer is adsorbed on the surface of a contact lens to be treated for hydrophilicity and such an amino group-containing polymer is crosslinked by a predetermined crosslinking agent to form a hydrophilic layer composed of the crosslinked amino group-containing polymer on the contact lens surface to have a hydrophilic nature imparted thereto, whereby the treatment to impart a hydrophilic nature to a contact lens which is durable against a physical impact such as rubbing with finger tips for cleaning can be accomplished by a simple operation without requiring an expensive apparatus.

What is claimed is:

1. A method for imparting a hydrophilic nature to a contact lens, which comprises dipping a contact lens in an aqueous solution containing a water-soluble amino group-containing polymer in an amount effective to impart a hydrophilic nature to the contact lens and a crosslinking agent in an amount effective to crosslink the amino group-containing polymer, and forming a hydrophilic layer of the amino group-containing polymer crosslinked on the surface of the contact lens.

2. The method according to claim 1, wherein the amino group-containing polymer is water-soluble collagen or its derivative.

3. The method according to claim 1, wherein the amino group-containing polymer is a derivative of polysaccharide.

4. The method according to claim 1, wherein the crosslinking agent is a glutaraldehyde.

5. The method according to claim 1, wherein the crosslinking agent is a polyfunctional compound reactive with at least two amino groups for crosslinking.

6. The method according to claim 1, wherein the amino group-containing polymer has carboxyl groups in addition to the amino groups, and the crosslinking agent is a condensed reagent capable of crosslinking the amino groups to the carboxyl groups.

7. The method according to claim 6, wherein the crosslinking agent is a carbodiimide.

8. A method for imparting a hydrophilic nature to a contact lens, which comprises contacting a contact lens to an aqueous solution containing a water-soluble amino group-containing polymer in an amount effective to impart a hydrophilic nature to the contact lens, to have the amino group-containing polymer adsorbed on the surface of the contact lens, and then contacting the contact lens to an aqueous solution containing a crosslinking agent in an amount effective to crosslink such an amino group-containing polymer, to crosslink the amino group-containing polymer on the surface of the contact lens and thereby to impart a hydrophilic nature to the contact lens.

9. The method according to claim 8, wherein the amino group-containing polymer is water-soluble collagen or its derivative.

10. The method according to claim 8, wherein the amino group-containing polymer is a derivative of polysaccharide.

11. The method according to claim 8, wherein the crosslinking agent is a glutaraldehyde.

12. The method according to claim 8, wherein the crosslinking agent is a polyfunctional compound reactive with at least two amino groups for crosslinking.

13. The method according to claim 8, wherein the amino group-containing polymer has carboxyl groups in addition to the amino groups, and the crosslinking agent is a condensed reagent capable of crosslinking the amino groups to the carboxyl groups.

14. The method according to claim 13, wherein the crosslinking agent is a carbodiimide.

15. The method according to claim 1 wherein the contact lens is a hard, hydrophobic contact lens.

16. The method according to claim 1 wherein the contact lens is a water nonabsorptive soft contact lens.

17. The method according to claim 8 wherein the contact lens is a hard, hydrophobic contact lens.

18. The method according to claim 8 wherein the contact lens is a water nonabsorptive soft contact lens.

19. A method for imparting a hydrophilic nature to a contact lens, which consists essentially of dipping a contact lens in an aqueous solution containing a water-soluble amino group-containing polymer in an amount effective to impart a hydrophilic nature to the contact lens and a crosslinking agent in an amount effective to crosslink the amino group-containing polymer, and forming a hydrophilic layer of the amino group-containing polymer crosslinked on the surface of the contact lens.

20. A method for imparting a hydrophilic nature to a contact lens, which consists essentially of contacting a contact lens to an aqueous solution containing a water-soluble amino group-containing polymer in an amount effective to impart a hydrophilic nature to the contact lens, to have the amino group-containing polymer adsorbed on the surface of the contact lens, and then contacting the contact lens to an aqueous solution containing a crosslinking agent in an amount effective to crosslink such an amino group-containing polymer, to crosslink the amino group-containing polymer on the surface of the contact lens and thereby to impart a hydrophilic nature to the contact lens.

* * * * *